United States Patent [19]

Bienvenu et al.

[11] 3,994,721
[45] Nov. 30, 1976

[54] PURIFYING A ZINC-BEARING SOLUTION BY CEMENTATION

[75] Inventors: Gerard Bienvenu, Annemasse, France; Aaron Boussiba, Geneva, Switzerland; Gustve Fache, Brussels, Belgium; Luigi Donadio, Rome, Italy

[73] Assignee: Societa Mineraria e Metallurgica di Pertusola, Rome, Italy

[22] Filed: Sept. 30, 1975

[21] Appl. No.: 618,116

Related U.S. Application Data

[63] Continuation of Ser. No. 382,180, July 24, 1973, abandoned.

[30] Foreign Application Priority Data

June 30, 1972  Switzerland.......................... 9827/72

[52] U.S. Cl.................................... 75/109; 75/119; 266/114; 266/135; 266/137
[51] Int. Cl.²......................................... C22B 3/00
[58] Field of Search............. 75/109, 119; 423/659, 423/102

[56] References Cited

UNITED STATES PATENTS

| | | | |
|---|---|---|---|
| 1,337,058 | 4/1920 | Field..................................... | 423/102 |
| 1,341,601 | 5/1920 | Sulman et al........................ | 423/102 |
| 3,154,411 | 10/1964 | Back et al............................. | 75/109 |
| 3,579,327 | 5/1971 | Hasegawa............................. | 75/109 |
| 3,707,356 | 12/1972 | De Witt............................... | 423/659 |
| 3,806,103 | 4/1974 | Martini et al...................... | 75/109 X |
| 3,874,940 | 4/1975 | Vera et al............................. | 75/109 |

OTHER PUBLICATIONS

*Metals Abstracts,* Apr. 1972, No. 42/0084, 42/0085.

*Primary Examiner*—Oscar R. Vertiz
*Assistant Examiner*—Brian Hearn
*Attorney, Agent, or Firm*—Hubbell, Cohen, Stiefel & Gross

[57] ABSTRACT

Zinc bearing solutions are subjected to cementation in at least one fluidized bed of zinc particles which are simultaneously subjected to transverse agitation to remove impurities precipitated on the particles.

5 Claims, 1 Drawing Figure

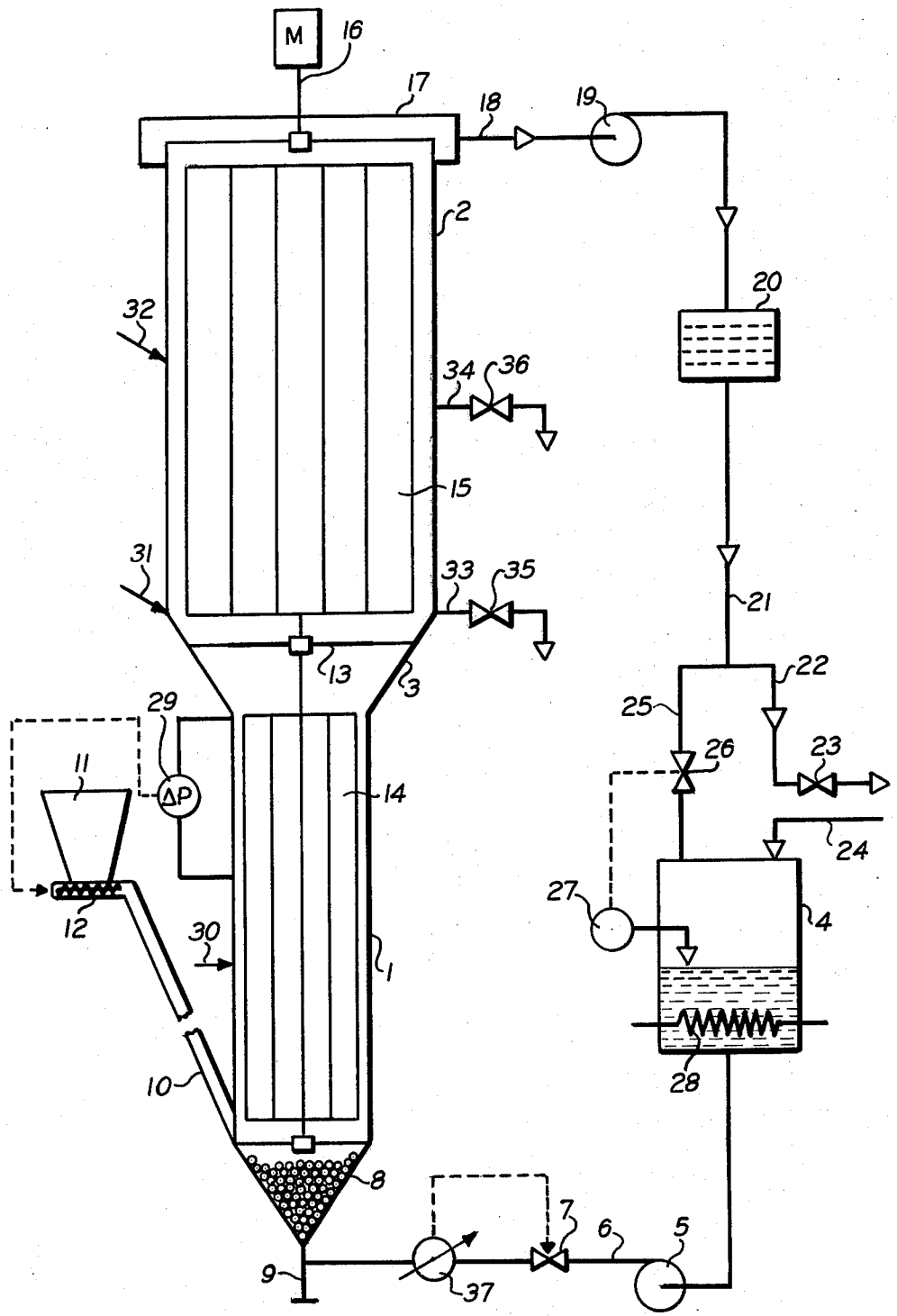

PURIFYING A ZINC-BEARING SOLUTION BY CEMENTATION

This is a continuation of application Ser. No. 382,180, filed July 24, 1973, now abandoned.

It has been known for a very long time to use reducing metals to cause the precipitation of dissolved metals, in particular for the purification of industrial solutions or waste liquors and recover dissolved metals therefrom. There is involved here a metal displacement reaction known by the name of "cementation", in which the reducing metal undergoes oxydation and passes into solution while the ions of the dissolved metals undergo reduction to the metallic state and precipitate on the surface of the reducing metal. The process of diffusion at the liquid-solid interface thus plays an important and frequently determinative part with respect to the velocity of said precipitation resulting from the metal displacement. The amount of metal precipitated therefore depends on the concentration of the dissolved metal to be precipitated, on the available surface or active surface of the reducing metal, on the time of the liquid-solid contact as well as on various factors which influence the rate of diffusion, particularly the degree of agitation or relative liquid-solid movement.

The object of the present invention is a process for purifying a zinc-bearing solution, intended particularly for the electrolytic production of zinc, by adding particles of zinc so as to effect a cementation which causes the precipitation of metallic impurities from the solution.

In order to carry out such a cementation it has heretofore been necessary to use complicated and very large installations comprising a plurality of vats, provided with mechanical mixers to assure an intimate and prolonged contact between the solution to be purified and a charge of very fine zinc particles. The conventional mixers used for this purpose, however, produce agitation of the entire solution including fine particles suspended therein but they do not make it possible to obtain a very substantial relative movement between the solution and the particles. Furthermore, these conventional mixers do not make it possible to take into account one important problem, namely the progressive passivation of the surface of the particles of zinc powder by deposits formed upon the reaction. As a matter of fact, such a precipitation by means of a mechanical mixer does not make it possible to obtain a truly satisfactory yield corresponding to an effective use of the zinc.

There has also been proposed a process of cementation intended for the precipitation of copper and cadmium by successive stages carried out in a plurality of conventional vats provided with mechanical agitators as well as in a cementation column traversed by a suspension of zinc powder in the zinc-bearing solution coming from a first mixing vat. A certain reduction in the over-all consumption of zinc on the part of the purification installation is thus obtained. However, this column by itself, does not make it possible to effect the complete precipitation of the copper and cadmium and for this reason it is combined with, inter alia, a plurality of conventional mixing vats in order to effect the complete removal of these impurities. Moreover, the installation comprising this column does not effect the precipitation of cobalt or other impurities and, therefore, by itself does not make it possible to obtain a purified solution such as necessary, for instance, for electrolysis.

The complicated problems which are presented by the process of cementation on zinc are explained below in further detail.

The process forming the object of the invention serves to effect the cementation on zinc by a reaction of the type:

$$n\, Zn^\circ + 2\, Me^{n+} \rightarrow n\, Zn^{++} + 2\, Me^\circ$$

in which Me is the precipitated metal and $n$ its valence.

This electrochemical reaction which takes place on the surface of the grains of zinc is affected by various physical and chemical parameters.

In order to be able to obtain a high degree of purification, it is, however, necessary for these parameters to be adjusted in such a manner that an equilibrium is established between the precipitation on the surface of the zinc and the scaling of the precipitates resulting from the cementation so as to assure a constant renewal of the active surface of the zinc in order that the reaction can take place unimpeded.

Now, it has been found that a good descaling can be obtained by suitable agitation which makes it possible to assure a substantial relative movement of the solution with respect to the particles of zinc in suspension. However, there is a lower limit for the size of the particles below which there is no possibility of effecting the descaling.

Furthermore, depending on the nature of the metals to be precipitated, the rate of mass transfer may be governed either by the diffusion or by the kinetics of the electrochemical reaction proper. Thus, for instance, the kinetics of the depositing of cadmium and copper is controlled by diffusion while that of cobalt is controlled essentially by the electrochemical reaction.

Among the parameters which participate in the electrochemical reaction upon the cementation, it has been found that the interactions between the different impurities, as well as the presence of different activators which favor cementation can play a very important or even critical part. In fact, the transfer co-efficient (K) of certain impurities may vary considerably as a function of the concentrations of the other impurities contained in the solution. Thus, for instance, the transfer co-efficient ($K_{Co}$) of cobalt is about $1.17 \times 10^{-3}$ cm/sec in the presence of an initial amount of antimony equal to that of the cobalt while this co-efficient becomes practically zero in the absence of antimony or another activator. This means that antimony has an important activating power for the cementation of cobalt. It is therefore advisable to see to it that the cementation of such impurities which can act as activators is not too rapid and if necessary, to correct the decrease in their concentration by injections purification.

The desired cementation can therefore be favored by the addition of certain activating agents to the solution to be purified. Thus, for instance, the cementation of cobalt can be substantially favored by an addition of antimony salts, such as the double tartrate of antimony and potassium. Likewise, other agents may be used to activate the cementation of certain impurities, for instance, arsenic which also activates the cementation of cobalt, inter alia. Copper sulfate can be added, furthermore, as activating agent.

Now, it is necessary that the addition of such activating agents be effected in well-determined quantities and at given stages of the purification, which represents an important problem in the conventional processes and apparatus in which the time of stay necessary for the purification is lengthy.

The object of the present invention is to permit an effective continuous purification of zinc-bearing solutions in such a manner as to obviate the various drawbacks mentioned above and take into account the problems indicated above.

For this purpose, the process forming the object of the invention is characterized by the fact that the cementation necessary for the desired purification is effected within at least one fluidized bed formed of zinc granules which are maintained in suspension in an ascending stream of the solution to be purified and by simultaneously subjecting the granules to a transverse movement which imparts to them a transverse velocity component with respect to said ascending stream in such a manner that the granules in suspension within the fluidized bed undergo repeated collisions during the cementation, the impurities precipitated on the granules undergo continual scaling-off as a result of said collisions and that the surface of the granules is thus continuously freed from the precipitates formed thereon during the cementation by continuously feeding zinc granules of predetermined mean size to the fluidized bed; and by regulating the feed of granules and the speed of said ascending stream as a function of each other and of the size of the granules so as to maintain the mean porosity of the fluidized bed at a value corresponding to an optimum rate of cementation within the bed, to cause the suspended zinc granules to dissolve and to consume them to the greater part until they attain a substantially reduced size at which they are carried off, at the same time as the precipitated impurities, by the stream of solution leaving the fluidized bed.

In this process, the entire cementation is carried out only in a fluidized bed formed of suspended granules and simultaneously subjected to agitation which causes transverse turbulence of these granules. Now this combination of fluidization with agitation makes it possible to assure complete cementation continuously under optimum conditions, as a result of which a very efficient utilization of the zinc granules and a continuous evacuation of the solution containing the particles of precipitated metal and the fine zinc particles can be obtained, which particles can be easily eliminated by filtration in order to obtain the purified solution.

As a matter of fact, the use of such a fluidized bed subjected to substantial transverse turbulence by mechanical agitation makes it possible to assure optimum diffusion at the liquid-solid interface as well as a very effective scaling off at the surface of the zinc granules. Now, experience has shown that the porosity of the fluidized bed, that is to say, the volume of liquid per unit of total volume of the bed exerts a substantial influence on the kinetics of the displacement reaction and there is in fact an optimum porosity of about 0.6 which gives a maximum degree of purification. A simple adjustment of the supply of zinc granules and solution to the fluidized bed makes it possible to maintain the mean porosity of the bed in the vicinity of this optimum value.

A suitable choice of the speed of ascent of the stream of solution as a function of the size of the zinc granules makes it possible, however, to maintain the zinc granules in suspension within the fluidized bed for a period of time which makes it possible to effect the entire cementation desired and then continually discharge the zinc particles of reduced size when said size becomes such that the particles are carried along outside of the bed. However, since the size of the zinc granules may be within a relatively wide particle size range, it may be advantageous to arrange the reaction enclosure in such a manner that it comprises a series of superimposed elementary chambers whose diameter increases and that the speed of ascent is reduced accordingly from one chamber to the next. This sub-division into elementary chambers will make it possible to assure a sufficient degree of utilization of the granules and a porosity near the optimum in each elementary chamber. The diameter of the last elementary chamber will then be chosen in such a manner that the fine granules of zinc whose size is too small to permit scaling off are carried along out of the last elementary chamber.

Practical experience has shown that mechanical agitation of the bed in such a manner as to impart to the fluidized granules a substantial transverse movement with respect to the ascending stream of solution, and thus cause repeated collisions of the granules, makes it possible effectively to assure the continuous scaling off of the precipitates and thus obtain a complete cementation in optimum fashion within the fluidized bed. For this purpose, it is advisable to use relatively large granules of a mean initial size of the order of 1 mm or even more and to have them carried along outside the fluidized bed when they reach a reduced size of about 0.2 mm.

The use of a machanically agitated fluidized bed permits a continuous and very effective contacting of a large surface of zinc with the solution. Furthermore, it makes it possible to effect in a simple and precise manner the injection of activators which make it possible to promote the desired cementation within the fluidized bed at predetermined levels of said bed. As a matter of fact, it is necessary for this injection of activators to be effected in a precise manner since their presence in excess may cause hyperactivation which results in a rapid redissolving of the precipitated metals at the time when the latter are no longer in contact with a sufficient amount of zinc, that is to say, just after the evacuation from the fluidized bed.

A preheating of the solution to be purified can be effected in order to promote the precipitation, particularly of cobalt. However, excessively high temperatures should be avoided since they may cause an increase in the rate of redissolving of the precipitated metals and of the liberation of gasses accompanying the cementation. As a matter of fact, there is an optimum temperature in each case and the temperature will be selected therefore in accordance with the composition of the solution to be purified. Another object of the invention is an apparatus for carrying out of the process of the invention. This apparatus is characterized by the fact that it comprises:

a cementation column provided with a lower inlet for the solution to be purified and an upper outlet for the purified solution;

a solution feed device, connected to said inlet and adapted to continuously provide it with the solution to be purified and thereby form the said ascending stream which passes through the column with a given speed;

a device for the continuous feeding of said column with zinc granules of predetermined mean size intended to form the said fluidized bed in the column;

mechanical agitating means arranged in said column so as to impart to the zinc granules the said transverse movement within the fluidized bed with respect to the said ascending stream; and control means associated with said two feed devices in such a manner as to maintain in said column the fluidized bed having the said predetermined porosity.

BRIEF DESCRIPTION OF THE DRAWING

The accompanying drawing shows by way of example one embodiment of an apparatus for the carrying out of the process of the invention.

This apparatus, shown in diagramatic vertical section in the sole FIGURE of the drawing, makes it possible continuously to obtain a purified zinc-bearing solution ready for the electrolytic production of the zinc. It may be used, for instance, for the purification of a zinc-bearing solution obtained by the leaching of roasted blende and containing 140 g/l of zinc, 240 mg/l of copper, 200 mg/l of cadmium and 10 mg/l of cobalt.

DETAILED DESCRIPTION

The apparatus is formed essentially of a tubular cementation column 1,2 provided with an agitator 14, 15. In the present case, this column comprises a lower primary chamber 1 and an upper secondary chamber 2 of larger cross section, these two chambers being connected to each other by a flared connecting chamber 3.

This cementation column is fed continuously with zinc-bearing solution to be purified with a predetermined adjustable rate of flow from a tank 4 containing said solution. A pump 5 mounted in a first feed conduit 6 provided with a valve 7 serves to conduct this solution from the tank 4 to the lower end of the chamber 1. The latter has an inclined bottom 8 into which the feed conduit 6 enters through an axial inlet so as to form a stream of solution circulating with a predetermined adjustable speed in chamber 1.

The column is furthermore continuously fed with zinc granules via an inclined feed tube 10 entering into the inclined bottom 8 and connected to a storage hopper 11 provided with a feed device 12 of adjustable rate. This feed tube 10 is inclined by an angle of about 30° with respect to the vertical so as to promote the passage of the zinc granules into the chamber 1 where they are placed in suspension and carried along by the ascending stream to form fluidized beds in the chambers 1 and 2. The largest zinc granules may, however, settle out on the bottom 8 to form a bed which is partially agitated by the ascending stream of solution. In order to avoid clogging of the solution inlet an unplugging device 9 is furthermore provided at the inlet where the conduit 6 enters the inclined bottom 8.

A transverse baffle 13 arranged in the intermediate chamber 3 serves to divert laterally the stream of solution emerging from the lower chamber 1 so as to assure uniform distribution of the stream of solution upon entrance into the upper chamber 2.

The agitator in the present case comprises 2 bar cages 14 and 15 arranged in the lower chamber 1 and the upper chamber 2 respectively. This agitator 14, 15 is driven by a shaft 16 in its turn driven by a motor M and serves to subject the zinc granules suspended in the fluidized beds to a substantial transverse stirring. This stirring makes it possible on the one hand to avoid premature entrainment of the zinc granules by freeing the particles of the hydrogen which is formed on their surface during cementation and makes them thus lighter. Furthermore, it makes it possible to keep the active surface of these particles clean by avoiding their becoming incrustated by salts at saturation and by detaching the films of precipitated metal which adhere thereto. Furthermore, this stirring permits the disaggregating of the precipitated metal particles and thus favors their entrainment and evacuation by the solution.

The solution as it arrives at the upper end of the chamber 2 flows into an annular channel 17 which in the present case is maintained under an inert atmosphere (nitrogen). It then passes into a discharge conduit 18 provided with a pump 19 which delivers it through a filter 20 which serves to remove therefrom all foreign particles contained therein and in particular the precipitated metals, the particles of zinc having reached the limit size at which they are entrained out of the fluidized bed of the upper chamber 2, colloids, etc.

A conduit 21 and a conduit 22 which is provided with a valve 23 are connected to the outlet of the filter 20 so as continually to evacuate the filtered purified solution, for instance, towards a storage tank, not shown.

The tank 4 is fed with solution to be purified from an outer source (not shown) via a feed conduit 24. The tank 4 is furthermore connected to a recycling conduit 25 connected to the conduit 21 at the outlet of the filter 20 and provided with a valve 26 which is controlled by a level controller 27. Thus, any variations in the rate of solution coming from the outer source via the conduit 24, can be compensated for by an addition of recycled solution to the tank 4 so as to assure in all cases the rate of flow of liquid necessary for optimum operation of the cementation column.

The inlet valve 7 is controlled by a regulating flow meter 37. The feed of granules is adjusted by a differential pressure gauge 29 which acts on the device 12 in such a manner as to maintain the fluidized bed at a constant means porosity within the chamber 1.

The tank 4 is furthermore provided with a heating device, indicated schematically by the part 28 whose heating power is controlled thermostatically by conventional means, not shown, in such a manner as to preheat the solution contained in the tank to a constant temperature of, for instance, 70° C.

The apparatus is, furthermore, provided with a series of injectors 30, 31, 32, serving for the continuous injection of the activating agents at different levels of the column. These injectors are associated with a device (not shown) for metering the quantity of activating agents to be injected. They are represented very schematically and may be arranged in such a manner as to effect a regular injection at the desired level over the entire cross-section of the column.

The upper chamber 2 is, furthermore, provided with two withdrawal pipes 33 and 34, each provided with a valve 35 and 36, respectively.

The apparatus described above operates in the following manner:

The zinc granules which are continually fed to the apparatus first of all form a primary fluidized bed of zinc granules suspended in the solution circulating upwards in chamber 1. A suitable selection of the speed of ascent of the solution as a function of the mean size of the granules makes it possible to maintain the granules in fluidized state in said primary bed, the porosity of said bed being maintained at a value close to the optimum, as described below.

The mean porosity between two levels of a fluidized bed may be determined easily by measurement of the differential pressure prevailing between these two levels. Now it has been found that for a given solution there is an optimum porosity which makes it possible to attain a maximum degree of purification in the fluidized bed. Thus, in the present case, the mean porosity of the primary fluidized bed is maintained at a measured optimum value close to 0.6 by regulating the feed of granules, which is controlled by the differential pressure gauge 29. This differential pressure gauge is located in such a manner that it measures the difference in pressure between two levels of the upper part of the bed, that is to say, in the zone where the porosity is greatest.

This fluidized bed serves to effect the precipitation of the impurities in solution on to the zinc granules, a part of which is oxidized and passes into solution, as already mentioned. This fluidization permits the contacting of a large amount of zinc with the solution to be purified. The transverse turbulence of this bed, obtained by agitator 14, makes it possible, however, to obtain a particularly high relative movement between the granules and the solution, which greatly favors the ionic transport necessary for the precipitation. Furthermore, this relative movement at the same time causes repeated collisions of the granules and thus assures the continuous removal of the deposits precipitated on their surface. As a matter of fact, as already mentioned, these deposits may bring about a progressive passivation and, therefore, incomplete utilization of the zinc. In the present case, the bar cage 14 of the agitator, arranged within the primary fluidized bed, therefore makes it possible to assure a satisfactory scaling off of the particles of zinc, that is to say, the continuous removal of the deposit precipitated on their surface and, therefore, a continuous renewal of their active surface. This agitator 14 furthermore makes possible the removal of the bubbles of hydrogen which are formed on the surface of the zinc granules and adhere to said surface so as to exert a vertical thrust on the granules. One therefore also avoids at the same time a premature ascent of the zinc granules out of the fluidized bed. As a matter of fact, without this agitation the formation of the said bubbles results in a substantial loss of the zinc granules before they can participate completely in the cementation.

The placing in solution of the zinc, however, leads to a progressive reduction in the size of the graules and thus brings about an increase of the porosity at the upper part of the chamber 1.

These particles of reduced size then pass from the chamber 1 to the chamber 2 whose cross section is larger and thus makes it possible to obtain a reduced velocity of ascent. These particles are fluidized in the secondary bed with a porosity close to the optimum to complete the precipitation in the upper chamber 2. The consumption of zinc is, however, less in this chamber 2 so that the variations in porosity will be relatively small in the secondary bed.

As will be seen further below, such an apparatus makes it possible to obtain good utilization of the zinc by feeding the apparatus described with zinc granules having a size close to 0.6 mm and with a rate of flow of solution of 1.84 m$^3$ per hour per dm$^2$ of cross section of the lower chamber 1, with a continuous addition of about 0.8 g of zinc granules per liter of solution treated. The ratio of the cross sections of the lower and upper chambers is thus determined by the desired ratio of the speeds of flow in said chambers. This ratio, which will generally be between 2 and 10, is 4.25 in the present case.

The volume of the primary fluidized bed must be sufficient to assure the precipitation of the greatest part of the impurities; in the present case the solution is purified in the lower chamber to a content of less than 1 mg/l of copper and 10 mg/l of cadmium.

The rate of supply of zinc granules to the apparatus is adjusted by means of the device 12 and is regulated by means of the differential pressure gauge 29 in such a manner that the mean porosity of the primary bed is maintained as constant as possible in the greater part of said bed at a value close to the optimum, namely 0.6 in the present case, the amount of zinc continually added corresponding approximately to 0.8 g/liter of purified solution.

As is evident from the foregoing, the apparatus described makes it possible to assure a simple and very precise regulation so as to obtain the optimum conditions necessary for the cementation within the fluidized bed.

Furthermore, this regulation can be effected very rapidly so as continually to take into account any variation in the composition of the solution to be purified. As a matter of fact, the time of passage of the solution subjected to purification in the column is obviously very short (for instance, of the order of 2 minutes) which permits continuous verification and immediate rectification of the operating conditions of the column.

The following examples illustrate the conditions for the carrying out of the process of the invention:

EXAMPLE 1

In a single fluidized bed formed in a reaction column of a constant cross section of 4 cm diameter and a height of 2m, there is effected the extensive purification of the zinc-bearing solution having approximately the following composition:

| | |
|---|---|
| Zn | 140 g/l |
| Cu | 200 mg/l |
| Cd | 215 mg/l |
| Sb | 0.08 mg/l |
| Co | 9 mg/l |
| Ni | 1 mg/l |
| Fe | 6 mg/l |
| Ge | 0.15 mg/l |
| As | 0.13 mg/l |

The rate of flow of solution is 100 liters per hour, the amount of zinc contained in the column being 4.5 kg.

3 Mg/l of antimony is first of all added to this solution and then every 50 centimeters in height of the fluidized bed (over a total height of 1.5 m) copper sulfate in solution is continuously added at the rate of 100 mg/l of initial solution; antimony tartrate is also added at the rate of 1 mg/l of solution every 50 centimeters (over a height of 1 m). The cementation is effected with agitation by means of a bar agitator rotating at 500 rpm. The temperature of the solution is maintained constant at 70° C and the mean porosity of the fluidized bed is maintained fixed at the optimum value of 0.6 by regulating the rate of flow of solution and by continuously adding zinc granules at the rate of 80 to 100 g/hour. The mean size of these particles is close to 0.6 mm. The linear speed of the solution is constant and equal to 2.46 cm/second in the present case.

After passage over 30 cm of the fluidized bed, the cobalt content has already dropped to 1.5 mg/l and is only 0.6 mg/l after 60 cm.

After filtration, the composition of the purified solution is as follows:

| | | |
|---|---|---|
| Zn | 140.5 | g/l |
| Cu | 0.2 | mg/l |
| Cd | 0.5 | mg/l |
| Sb | 0.01 | mg/l |
| Co | 0.4 | mg/l |
| Ni | 0.05 | mg/l |
| Fe | 6 | mg/l |
| Ge | 0.001 | mg/l |
| As | 0.001 | mg/l |

The amount of zinc consumed is less than 1 g/liter, which corresponds to about one-quarter of the consumption in the conventional processes. The particles retained by the filter comprise a relatively large amount of copper and cadmium.

EXAMPLE 2

A solution having the initial composition indicated in Example 1 is purified in two stages, the first stage serving to precipitate the cadmium and the copper free of cobalt. For this, one operates in this first stage without the addition of activators and at a temperature of 50° C.

Operating in the same manner as in Example 1, in a column of a height of two meters with zinc granules of a mean particle size equal to 0.6 mm, with a mean porosity of the fluidized bed of 0.6, the linear velocity of the solution is then equal to 2.46 cm/sec as in the first example. At the end of this first stage, the amount of antimony and cobalt dissolved in the solution is practically unchanged. On the other hand, practically all the copper as well as the cadmium are precipitated, the contents at the end of the first stage being:

| | |
|---|---|
| Cd | 2 mg/l |
| Cu | 1 mg/l |

After filtration, one proceeds with the second stage in which an exhaustive purification is effected in a second column with the use of activators.

In the second stage one operates, in the same manner as in the first stage, with a column of about 2 meters but at a higher temperature of the order of 70° C; as a matter of fact, the temperature could vary between 65° and 90° C. The continuous addition of the activators is effected every 50 cm starting from the base of the column, but in this case the effectiveness would be decreased. Whatever the manner of addition of the copper and antimony activators, the quantities added per liter of solution are as follows:

| | |
|---|---|
| Cu | 100 mg/l |
| Sb | 6 mg/l |

One can also add cadmium in solution to avoid the redissolving of the cements in the filter, particularly of the antimony. If this precaution is not taken, zinc fines can be added to the feed of zinc granules to the column. The composition of the filtered solution upon emergence from said second column is approximately the same as that of the solution obtained after the treatment which forms the object of Example 1.

The total consumption of zinc in the two stages is slightly greater than in Example 1, namely slightly higher than 1 g/l.

EXAMPLE 3

The purification of a zinc-bearing solution of a pH of 5 and a temperature of 70° C is effected in a column of a diameter of 4 cm and a height of 2 m, forming a fluidized bed having a porosity of the order of 0.6, composed of zinc granules of an average particle size of 0.8 mm and a total weight of 4.5 kg.

The initial impurity content of the solution which is supplied to the column at a constant rate of flow of 1.5 l/mn is as follows:

| | Cu | Cd | Co | Sb | Ge | Fe |
|---|---|---|---|---|---|---|
| mg/l | 196 | 470 | 7.4 | 1.5 | 0.010 | 20 |

During the cementation, activating agents are injected into the solution every 30 cm over a total height of 120 cm, as follows:

| Level of injection | | 30 | 60 | 90 | 120 |
|---|---|---|---|---|---|
| Activator Content in | Cu | 100 | 100 | 50 | 50 |
| mg/l of injected solution | Sb | 0.25 | 0.25 | — | — |

However, it has not been attempted to regulate the manner of injection of the activators so as to obtain the best purification.

As a matter of fact, in the purification tests carried out in the present case, a single parameter is varied, namely the agitation of the fluidized bed.

Thus, the chemical conditions of the cementation in the fluidized bed are maintained constant in the tests and the variations with time of the composition of the purified solution emerging from the column with and without agitation are examined:

When the fluidized bed cementation is effected under the conditions mentioned above with the use of a bar agitator which extends over the entire height (2 m) of the column and rotates at 400 rpm, a steady state of purification is rapidly established.

After elimination of the cements Cu, Cd, Co, etc., in a filter press, the Co and Sb content of the purified solution is then:

| Content | Co | Sb |
|---|---|---|
| mg/l | 0.8 | 0.03 |

On the other hand, when the agitator is stopped, the composition of the purified solution varies with time as follows:

| | Content | mg/l |
|---|---|---|
| Time (hours) | Co | Sb |
| 1 | 0.9 | 0.03 |
| 2 | 1.2 | 0.04 |

| Time (hours) | Content Co | mg/l Sb |
|---|---|---|
| 3 | 2.8 | 0.12 |

Furthermore, it was necessary to stop the purification at the end of this period of 3 hours since, as a result of the presence of hydrogen bubbles on the granules of the non-mechanically agitated fluidized bed, a substantial entrainment of these granules out of the bed by the ascending stream of solution takes place.

Thus, in the absence of mechanical agitation, one does not succeed in maintaining a constant rate of purification with time, both from a physical standpoint and from a chemical standpoint. As a matter of fact, it is found that it then becomes no longer possible to maintain the fluidized bed over the entire height of the column. This is due to a premature evacuation of the zinc granules before complete reaction as a result of the bubbles of hydrogen formed which adhere to the surface of the granules so as to create an additional thrust causing the premature removal of the granules out of the fluidized bed.

Furthermore, a progressive decrease is noted in the effectiveness of the column and the rate of purification as a result of the progressive passivation of the surface of the zinc granules, which passivation is due to the formation of the said gas bubbles, on the one hand, and to the covering of the surface by precipitated cements, on the other hand. As a matter of fact, it has been found that the natural agitation obtained by the fluidization of the granules in insufficient to obtain the scaling off of the cements which is necessary for the obtaining of satisfactory continuous purification within the fluidized bed.

On the other hand, the cementation effected, as described, by means of a fluidized bed in which the fluidized granules are subjected to transverse agitation makes it possible, due to the scaling off thus obtained, to assure the complete continuous purification under physical and chemical conditions the regulating of which is relatively easy and makes it thus possible to obtain optimum conditions for the desired purification in each case.

As appears from the foregoing, the process of the invention permits continuous precipitation with very satisfactory yield by simple means comprising essentially a column which is provided with an agitator and takes up a minimum amount of space. It is then sufficient in each case to effect a suitable selection of the velocities of the solution and of the feed of particles and to impart the primary and secondary beds the volume which makes it possible to assure the precipitation desired.

It should be pointed out that the process of the invention also lends itself to purposes other than the obtaining of purified solutions intended for the electrolytic production of zinc. Thus, this process could be used, for instance, for the obtaining of cadmium sponge.

Although the present trend in the field of the purification of solutions is to effect a total recovery of the impurities, one could contemplate effecting by the process of the invention a purification with selective recovery of the impurities, particularly of the cobalt, in order to simplify the subsequent treatment of the precipitates.

What we claim is:

1. A method of continuously removing metallic impurities dissolved in a zinc-bearing solution, this method comprising:
    a. passing a stream of said solution upwardly through a reaction zone of substantially constant cross sectional area,
    b. maintaining zinc metal particles in suspension as a fluidized bed in said zone,
    c. continuously feeding zinc metal particles to said reaction zone at the lower portion thereof, said particles having a mean particle size of not less than about 0.6 mm,
    d. regulating the feed rate of said zinc particles and the feed rate of said stream so as to maintain in said reaction zone a fluidized bed having a constant mean bed porosity of about 0.6,
    e. repeatedly colliding said zinc particles with one another to effect abrasion and removal of metallic impurities which have precipitated on to said particles, said repeated colliding being effected by subjecting the fluidized bed of said particles substantially along the entire height of said bed to continuous transverse mixing and thereby imparting to all of said particles a horizontal velocity component, said steps (a) through (e) being effected continuously so as to dissolve in said upwardly passing stream of said solution a major portion of the zinc in said particles and thereby substantially reduce the size of said zinc particles from their original size to form finer size zinc particles, and
    f. continuously removing said finer size zinc particles together with fine particles of said metal impurities by continuously withdrawing said solution from the upper portion of said reaction zone, said withdrawn solution containing in suspension therein said finer size zinc particles and said fine particles of metal impurities.

2. The method of claim 1 wherein said metallic impurities dissolved in said zinc-bearing solution include dissolved cobalt, said method additionally comprising continuously injecting into said reaction zone at different levels a chemical activating agent for promoting the precipitation of cobalt, to thereby effect precipitation of cobalt upon said zinc metal particles, said activating agent being an antimony salt, arsenic, or copper sulfate.

3. The method of claim 1 wherein said zinc metal particles that are continuously fed pursuant to step (c) have a mean particle size of about 1 mm.

4. The method of claim 1 wherein there is disposed within said reaction zone a bar-cage rotatable about its vertical axis, said bar-cage extending substantially the entire height of said fluidized bed, and wherein said continuous transverse mixing of step (e) is effected by rotating said bar-cage.

5. The method of claim 1, said method further comprising passing said withdrawn solution upwardly through a second reaction zone of substantially constant cross-sectional area, said cross-sectional area being greater than the cross-sectional area of said reaction zone referred to in step (a), the upward velocity of said solution in said reaction zone being less than the velocity in said reaction zone referred to in step (a), and maintaining said finer size zinc particles and said fine particles of metal impurities as a fluidized bed in said second reaction zone while subjecting said second fluidized bed of said particles substantially along the entire height of said bed to continuous transverse mixing and thereby imparting to all of said particles a horizontal velocity component.

* * * * *